(12) United States Patent
Rayman et al.

(10) Patent No.: US 9,375,607 B1
(45) Date of Patent: Jun. 28, 2016

(54) EXERCISE APPARATUS

(71) Applicant: Sculpted Partners LLC, New York, NY (US)

(72) Inventors: Erika Rayman, New York, NY (US); David Cowan, Cornwall Bridge, CT (US)

(73) Assignee: SCULPTED PARTNERS LLC, New York, NY (US)

( * ) Notice: Subject to any disclaimer, the term of this patent is extended or adjusted under 35 U.S.C. 154(b) by 0 days.

(21) Appl. No.: 14/577,090

(22) Filed: Dec. 19, 2014

(51) Int. Cl.
*A63B 23/04* (2006.01)

(52) U.S. Cl.
CPC ......... *A63B 23/0405* (2013.01); *A63B 23/0494* (2013.01); *A63B 2023/0411* (2013.01)

(58) Field of Classification Search
CPC ............... A63B 21/00181; A63B 21/0083; A63B 21/0085; A63B 21/068; A63B 21/4047; A63B 2023/0411; A63B 69/04; A63B 2244/24; A63G 11/00
See application file for complete search history.

(56) References Cited

U.S. PATENT DOCUMENTS

| | | | |
|---|---|---|---|
| 2,201,036 A | 2/1939 | Guerrier | |
| 4,618,140 A * | 10/1986 | Brown | A63B 22/0076 482/112 |
| 5,201,694 A | 4/1993 | Zappel | |
| 5,643,147 A * | 7/1997 | Huang | A63B 21/068 482/72 |
| 7,247,128 B2 | 7/2007 | Oga | |
| 7,452,311 B2 * | 11/2008 | Barnes | A63B 21/00072 482/137 |
| 2012/0058866 A1 * | 3/2012 | Hongo | A63B 21/00072 482/131 |
| 2013/0324374 A1 * | 12/2013 | Ellis | A63B 21/0615 482/97 |

* cited by examiner

*Primary Examiner* — Oren Ginsberg
*Assistant Examiner* — Jennifer M Deichl
(74) *Attorney, Agent, or Firm* — Ladas + Parry LLP

(57) ABSTRACT

An exercise apparatus for the exercise of a user's gluteus muscles through a supported seated squat downward from an upper starting position and a upward return movement has a base, a pair of user foot support ramps mounted to the base for supporting the toe portions of the feet with the heels on the floor, a pair of spaced fixed uprights mounted to the base and located forward of the foot supports terminating in a pair of hand grips. A buttocks support assembly with an angled buttocks support pad is pivotally mounted to the uprights, and a compressible linkage connects the pad assembly to the base. The linkage provides an opposing force to the downward travel of the support assembly and a boost restoring force to the support assembly for returning the support pad to an upper starting position. The user provides a controlled descent from an initial upper position to a squat and a controlled return from the squat to the upper position. The angled orientation of the support pad and the foot support ramps assist in positioning the user to operate the apparatus such that the weight of the user is not fully supported by the pad and remains directed through the heels during a full range of exercise motion.

20 Claims, 7 Drawing Sheets

EXERCISE APPARATUS

The present invention relates to a new and improved exercise apparatus and particularly to such type of apparatus that is manually operated and targets the gluteus muscle group.

BACKGROUND OF THE INVENTION

The three main muscles of the human gluteus group, the gluteus maximus, media and minimus (the "glutes") make up the buttocks, and are important as they serve to maintain the trunk in an erect posture. Among other actions, they allow the body to regain an erect position after stooping and also collectively act as a rotator of the legs. They are involved in numerous sports, particularly where running is involved. In addition, a well-formed buttocks, especially in women, is typically viewed as an integral part of an attractive appearance.

Numerous exercises, including squats and lunges, target the gluteus muscles. These exercises, which traditionally rely upon the carrying of a barbell on the shoulders of the individual, require some level of dexterity and balance, as well as strength to lift the barbell into position. It may be uncomfortable for the user to support and maintain the weights in the proper position. For effective exercise, proper form is required. Exercise devices, such as a power cage or an upright frame known as a Smith machine, can be used to perform squats, and allow the weights to travel vertically along a predetermined path, preventing the barbell from moving forwards, backwards or sideways.

Other apparatuses have been developed for specific use in exercising the glutes. The Body-Solid lower body gym requires the user to be in a prone position, the legs alternately pushing against a weight which travels upwardly along a track. The Rogue Abram GHD 2.0 device likewise requires the user to assume a prone position, the hips and legs being supported while the user bends down at the waist and returns to a fully horizontal, prone position. U.S. Pat. No. 5,201,694 discloses an exercise apparatus in which the user is seated, the seat being counterbalanced. Upon reaching the squatting position, the counterbalance assists the user in returning to the original position. U.S. Pat. No. 7,247,128 likewise discloses an apparatus in which the user is in a sitting position, the user's hands gripping levers that are coupled to the seat to allow the users arms to assisting in lifting the seat from a lowered. Lastly, U.S. Pat. No. 2,201,036 discloses a seesaw construction intended for use by a single operator, the user sitting on a seat at the end of a lever arm, a spring at an opposite lever arm assisting the user to return to an upper position after squatting.

BRIEF DESCRIPTION OF THE INVENTION

The present invention is directed to an exercise apparatus of the general type in which the user is supported by the apparatus to perform a squatting maneuver, the device allowing control over both the squatting maneuver and return of the user to the upright position. It represents an improvement over similar apparatuses, in that it is configured to insure proper user form and positioning. It is designed to shift the body's center of gravity to a proper position to focus the exercise concentration on deep muscle tissue and to allow the user to exercise each of the main glute muscles. The apparatus is also configured to be compact, easily movable, and collapsible for storage.

The exercise apparatus of the invention comprises a buttocks support pad mounted to a pivoting arm. The arm is pivotally attached to a pair of uprights which also support a pair of hand grips. The uprights in turn are mounted to a frame which sits upon the floor and further supports a pair of angled foot ramps. The buttocks support arm is biased by a linkage system. With the user's buttocks resting against the pad with her hands gripping the hand grips and toes on the foot supports, the linkage system, acting against the dropping of the pad and arm, provides for a controlled squatting movement by the user, allowing tensing of the glutes. From a lowered position the linkage system assists the user in slowly returning to an initial upper position. A slow and controlled body movement is vital for proper exercise training of the involved muscles.

The uprights are foldable from the upright position to a position coplanar with the base elements, placing the pad and pad support arm, hand grips and base in a compact orientation for storage. With a set of wheels at one end of the base elements the collapsed unit can be easily moved.

BRIEF DESCRIPTION OF THE DRAWINGS

A fuller understanding of the present invention will be achieved upon consideration of the following detailed description of an illustrative embodiment of the invention, when reviewed in conjunction with the annexed figures wherein.

DETAILED DESCRIPTION OF THE INVENTION

Figure 1:
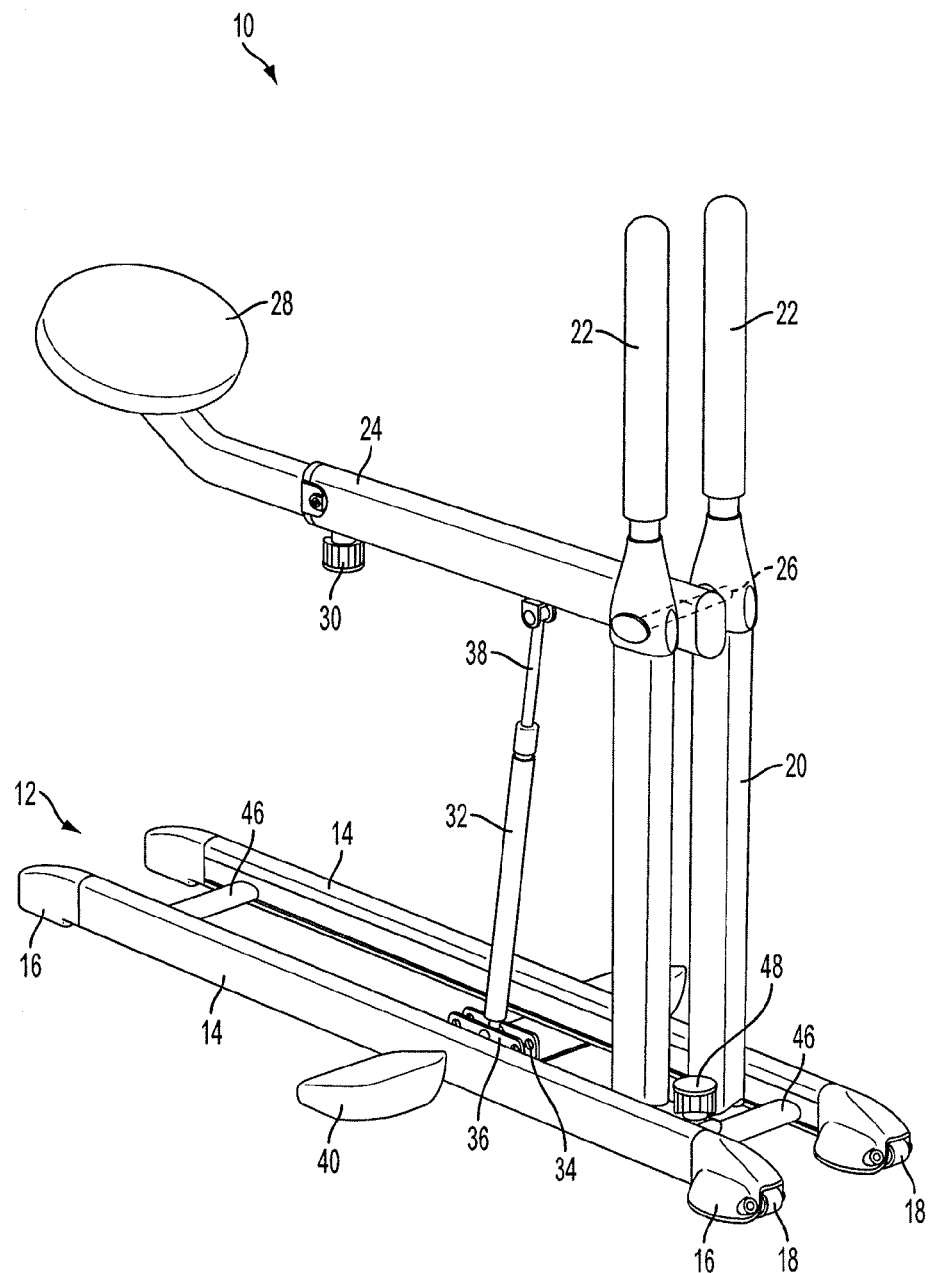
FIG. 1 is a perspective view of the apparatus in the upright, starting position for an exercise.
Figure 2:
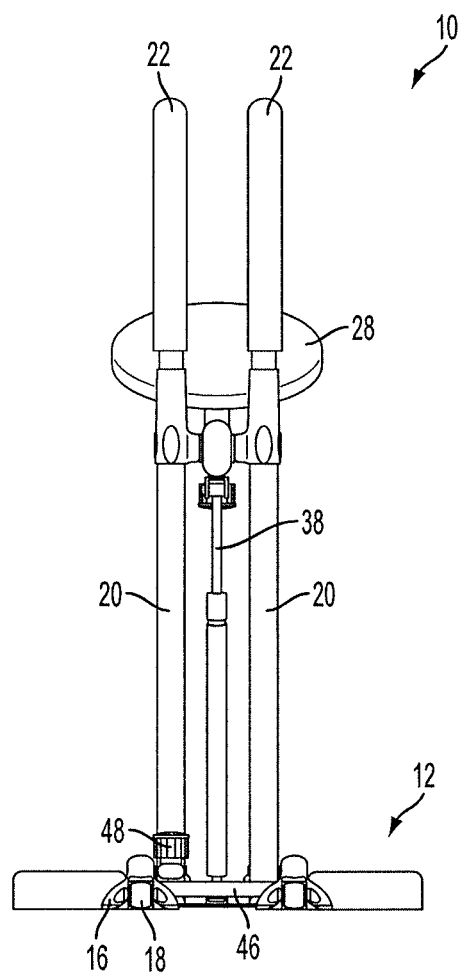
FIG. 2 is a front elevation view of the apparatus.
Figure 3:
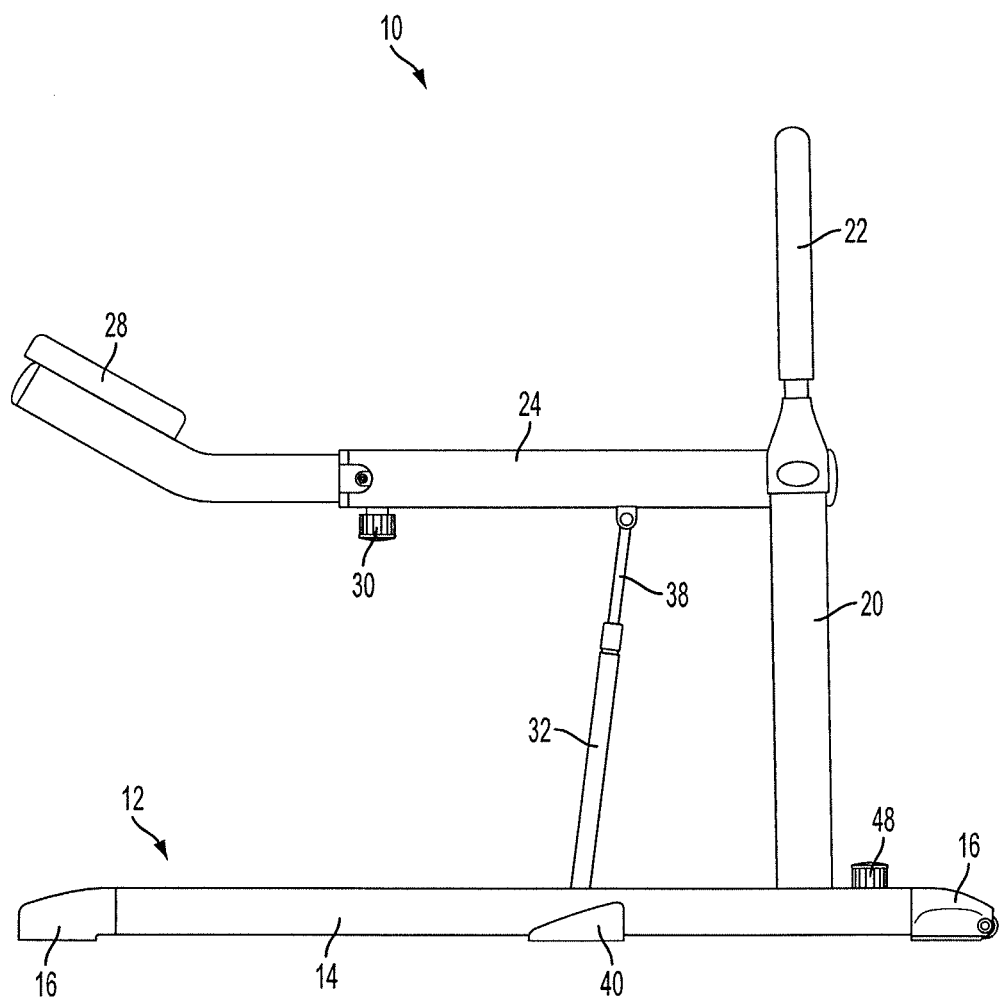
FIG. 3 is a side elevation view of the apparatus

As seen in drawings, and particularly FIGS. 1-3, exercise apparatus 10 comprises a base 12 formed of a pair of parallel horizontal beams 14. Floor pads 16 may be located at their ends, raising the beams slightly above the floor surface along their lengths and providing a set of non-slip contact surfaces with the floor. Wheels 18 may be journalled in a pair of the pads in a known manner to assist moving the apparatus. The two beams 14 are joined at their ends by transverse beams 46.

A pair of uprights 20 extend upwardly from the base beams, and terminate at their upper ends in a pair of handle grips 22. The grips may be provided with a cushioned covering, as known in the art, to provide a comfortable gripping surface for the user's hands. The handle grips may also be adjustable in height to accommodate users of varying heights. The uprights 20 may be pivotally connected to the base beams to allow them to be folded downwardly to a storage position, as will be discussed infra.

The uprights provide a mounting for the forward end of buttocks pad support arm 24, which likewise may be pivotally connected to the uprights by a transverse rod 26 extending between the uprights. The arm 24 supports at its distal end buttock pad 28 which, when the arm is in an upper, generally horizontal, position, defines an acute angle with respect to the horizontal. The angle may be on the order of 45 degrees. The support arm may be of a telescoping construction, the overall length of which may be maintained by locking knob assembly 30 which, in accordance with known methods, can either apply retaining pressure against the inner telescoping element or passes a pin through a chosen one of a plurality of spaced holes in the inner element aligned with the knob assembly. A linkage system, preferably in the form of a biasing element, such as damper 32, extends between the buttocks support arm 24 and the base 12. The biasing element provides an opposing force against downward motion of the buttocks pad and support arm, as well as a returning force to drive the pad and support arm upward from a lowered position. The damper may be adjustable to control the force level. As depicted, the damper may be a shock absorber-like unit, providing a resistance to compression of the damper piston into the damper body and providing a restoring force directed to extension of the piston to the extended position. The adjustment may be performed, for example, by varying the connection position of the damper along the base through selective mounting in a chosen one of the spaced holes 34 in u-shaped retainer 36. As the angle of the damper with respect to the vertical increases, the degree of compression effected by the travel of piston rod 38 lessens over the range of support arm motion, with a corresponding lessening in the amount of force needed for the compression.

The base beams also support a pair of foot ramps 40 that project outwardly from the beams. The ramps have top surfaces at an acute angle to the horizontal, sloping upward towards the front of the apparatus. The ramp angle may be on the order of 20 degrees.

Figure 4:
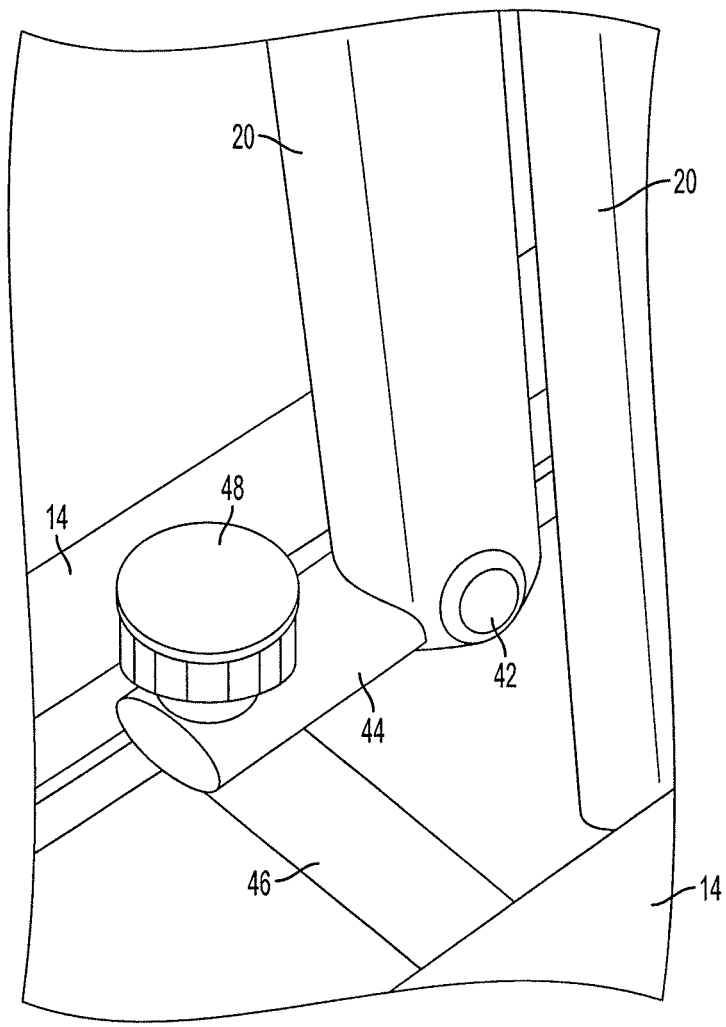
FIG. 4 is a detail view of a locking bracket for the apparatus
Figure 5:
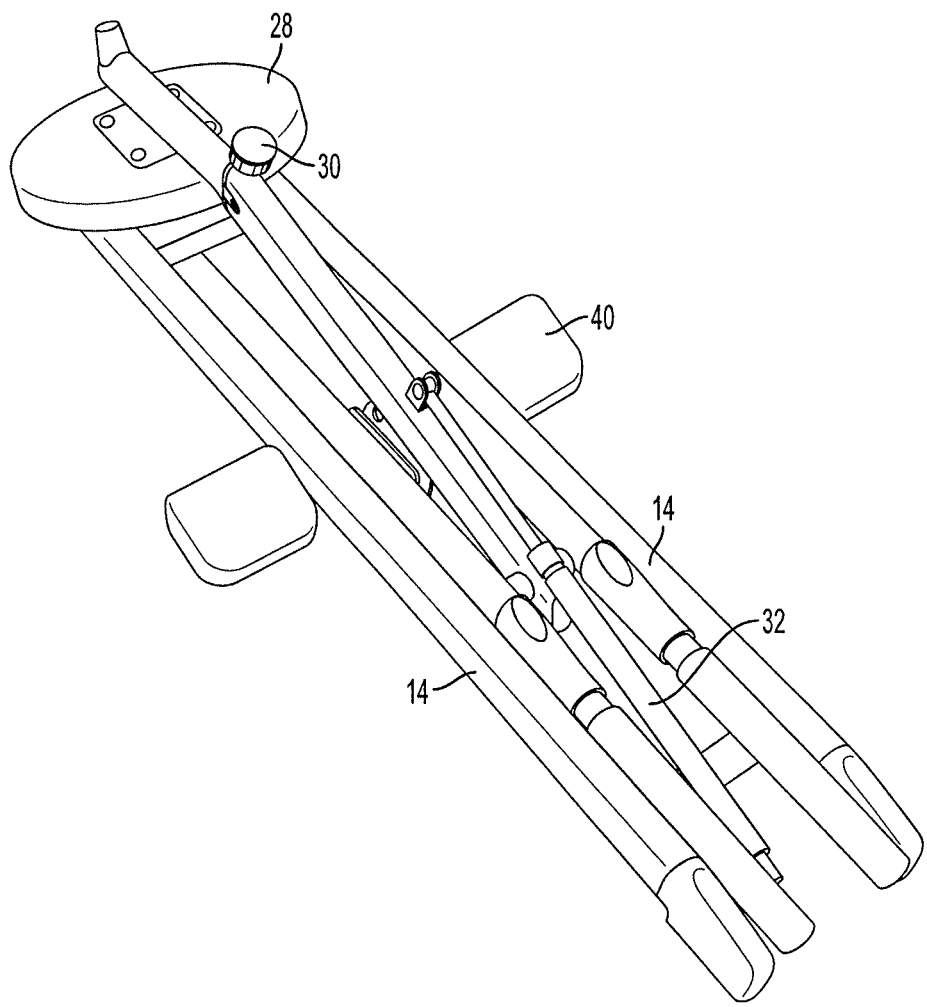
FIG. 5 is a perspective view of the apparatus in a folded, storage configuration.

As detailed in FIG. 4, the uprights 20 are journalled for pivoting between the upright position as depicted in FIGS. 1-3 and a collapsed position as illustrated in FIG. 5 by a pair of axle joints 42 connecting them to the base beams 14. Arm 44 extends forwardly from one of the uprights proximate its axle joints, and supports a locking member 48 comprising a threaded rod extending through the arm headed with an operating knob. The rod is positioned to engage with a complementary threaded bore in the forward base transverse beam 46, such that when engaged the uprights are maintained in the vertical operating position. When the rod and bore are manually disengaged the uprights may be pivoted back to lie between the base beams, as illustrated in FIG. 5. With the damper 32 disengaged from the retainer 36 the buttocks pad support arm 24 may be pivoted forward to in turn lie between the collapsed uprights, the damper in turn lying along the arm. So collapsed, the apparatus forms a compact unit for transport or storage. One end of the collapsed unit can be lifted, wheels at the opposite end allowing the unit to be rolled along as desired. To reassemble the apparatus the buttocks support arm is pivoted back and the uprights raised to the operating position, being secured there by screwing down the locking member 48 into the transverse beam 46.

Figure 6:
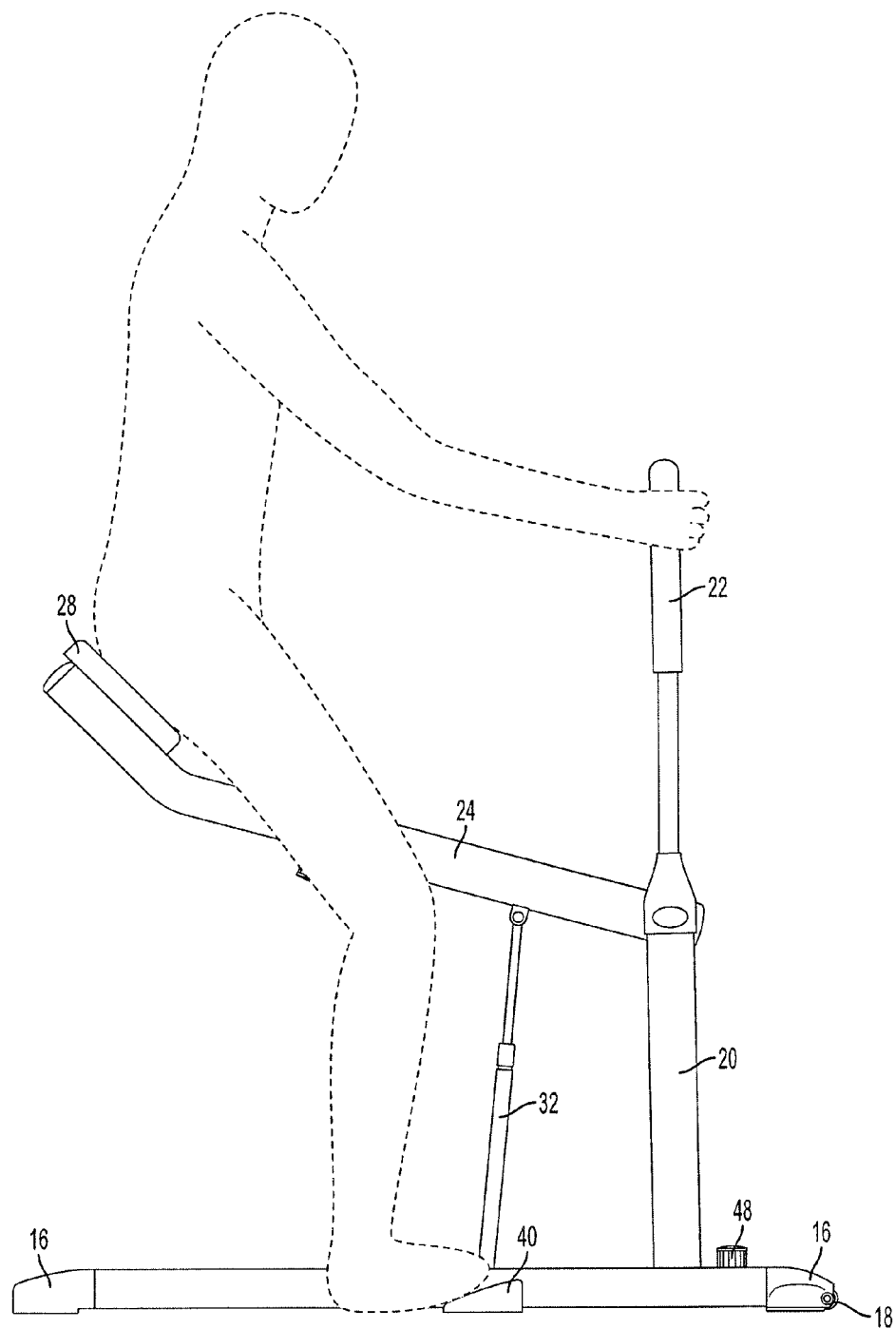
FIG. 6 is a side elevation view of the apparatus in the upright starting position, depicting the orientation of a user thereon.
Figure 7:
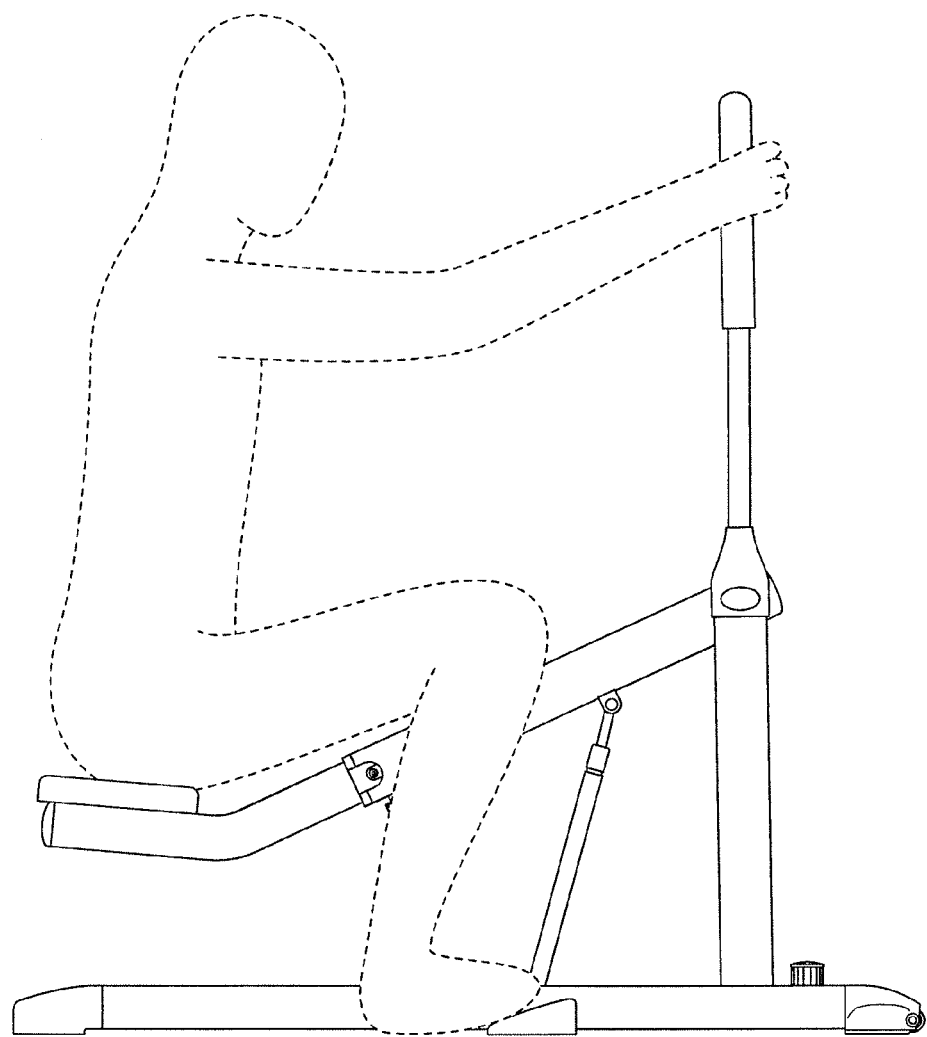
FIG. 7 is a side elevation view of the apparatus in a lowered position, depicting the orientation of a user in a squat position thereon.

As depicted in FIGS. 6 and 7, a user of the apparatus straddles the buttocks support arm 24, resting the buttocks on the pad 28. The slope of the pad requires the user to maintain her position on the pad by tensing the leg and buttocks muscles, rather than simply sitting in a relaxed position on the pad. The user's feet engage the foot ramps 40 with the forward portion of the feet and the heels on the floor, such that the user's weight is directed to and through the heels, thus also causing tension to the leg and buttocks muscle groups. The distance between the buttocks pad and the hand grips 22 is adjusted through the locking arm assembly 30 such that the user's arms are substantially extended such that the user can maintain an erect position on the pad.

The user squats down in a controlled, slow manner, damper element 32's upward opposing force assisting in controlling the descent speed, the user exercising the glutes to effect the desired controlled descent. From a lowered position the user rises up, the damper's upward force assisting the user and again allowing the rise up to be in a slow controlled manner, the glutes being further exercised.

We claim:

1. An exercise apparatus for the exercise of a user's gluteus muscles through a supported seated squat downward from an upper starting position and a upward return movement, comprising:
    a base;
    a pair of user foot support ramps mounted to the base for supporting the toe portions of the feet with the heels on the floor, the ramps being positioned and oriented to position the user upon the apparatus whereby weight of the user is directed through the heels during a full range of exercise motion;
    a pair of spaced fixed uprights mounted to the base and located forward of the foot supports, the uprights terminating in a pair of non-moving user hand grips, the uprights configured to remain in a fixed position throughout the exercise;
    a buttocks support assembly pivotally mounted to the uprights and extending rearwardly thereof, the assembly having a buttocks support pad at a distal end thereof located rearwardly of the foot supports; and
    a compressible linkage connecting the support assembly and the base, the linkage providing an opposing force to downward travel of the support assembly and a boost restoring force to the support assembly for returning the support pad to an upper starting position in conjunction with a return of the user supported by the pad from the squat by extending the user's legs, thereby exercising the user's gluteus muscles.

2. The exercise apparatus of claim 1 wherein the compressible linkage is a damper.

3. The exercise apparatus of claim 1 wherein the pad is at an acute angle to the horizontal when the pad support assembly is in the upper starting position whereby, in use, the user's glute muscles are tensed to maintain the user's buttocks in contact with the pad.

4. The exercise apparatus of claim 3 wherein the angle is 45 degrees.

5. The exercise apparatus of claim 1 wherein the horizontal distance between the seat and the foot ramps is chosen such that, in use, the user's weight is maintained on the user's heels during squat and return.

6. The exercise apparatus of claim 5 further comprising means for adjusting the horizontal distance between the buttocks pad and foot ramps and maintaining that distance during apparatus use.

7. The exercise apparatus of claim 6 wherein the horizontal adjusting means further comprises means for adjusting the horizontal distance between the buttocks pad and the hand grips.

8. The exercise apparatus of claim 1 wherein the uprights are pivotally mounted to the base to allow the uprights to be pivoted between a fixed vertical operating position and a storage position generally parallel to the base.

9. The exercise apparatus of claim 8 wherein the compressible linkage is mounted to the base assembly through a disconnect mechanism.

10. The exercise apparatus of claim 9 wherein the base consists of a pair of base rails, the uprights and disconnect mechanism being positioned between the rails, the foot support ramps being positioned on exterior sides of the rails.

11. The exercise apparatus of claim 8 further comprising a locking mechanism for the uprights to selectively maintain the uprights in the fixed vertical position.

12. The exercise apparatus of claim 11 wherein the locking mechanism provides a selectable engagement between the uprights and a transverse beam extending between the base rails.

13. The exercise apparatus of claim 1 further comprising means for adjusting a height of the hand grips above the buttocks support assembly.

14. The exercise apparatus of claim 1 wherein the opposing force provided by the compressible linkage is adjustable.

15. The exercise apparatus of claim 14 wherein a force adjustment is accomplished by varying an angle between the compressible linkage and the buttocks support assembly when the assembly is in the upper starting position.

16. The exercise apparatus of claim 1 wherein the buttocks support pad is so positioned with respect to the hand grips whereby, in use, the arms of a user are fully extended through the full range of exercise motion.

17. A method for exercising the muscles of the gluteus group of a human body user on an exercise device comprising a base supporting uprights having handgrips, a biased buttocks support assembly pivotally attached to the uprights and supporting a buttocks support pad, and a pair of foot ramps mounted to the base, comprising the steps of:

positioning the buttocks support pad with respect to the uprights and foot ramps to aligning the body user on the device such that user buttocks are in contact with the pad and hands of the user grip the handgrips with the buttocks support assembly being in an initial, generally horizontal position, such that the gluteus muscles are in the state of initial tension to maintain the contact with the pad, the feet of the user being on the foot ramps with only forward portions of the feet on the ramps;

allowing the buttocks assembly to pivot downwardly to a lower position in a slow controlled motion by controlled action of the gluteus group; and returning the buttocks assembly to the starting position by a controlled gluteus group action with the feet of the user remaining on the foot ramps in their initial orientation; and wherein the user's arms remain in a fully extended position throughout a full range of exercise motion, the positioning of the ramps further maintaining the orientation of the user whereby weight of the user is directed through the heels during the exercise motion with the feet being retained on the ramps.

18. The method of claim 17 wherein the buttocks support assembly is biased oppositely to a downward pivoting force.

19. The method of claim 18 wherein the buttocks support assembly is biased to assist the returning of the buttocks assembly to the starting position.

20. An exercise apparatus for the exercise of a user's gluteus muscles through a supported seated squat downward from an upper starting position and a upward return movement, comprising:

a base;

a pair of user foot support ramps mounted to the base for supporting the toe portions of the feet with the heels on the floor, the ramps being positioned and oriented to position the user upon the apparatus whereby weight of the user is directed through the heels during a full range of exercise motion;

a pair of spaced fixed uprights mounted to the base and located forward of the foot supports, the uprights terminating in a pair of non-moving user hand grips;

a buttocks support assembly pivotally mounted to the uprights and extending rearwardly thereof, the assembly having a buttocks support pad at a distal end thereof located rearwardly of the foot supports, the buttocks support pad so positioned with respect to the hand grips whereby, in use, the arms of a user are fully extended through the full range of exercise motion; and a linkage connecting the support assembly and the base, the linkage providing an opposing force to downward travel of the support assembly and a boost restoring force to the support assembly for returning the support pad to an upper starting position in conjunction with a return of the user supported by the pad from the squat by extending the user's legs, thereby exercising the user's gluteus muscles;

the foot support ramps assisting in positioning the user to operate the apparatus such that whereby, in use, the weight of the user remains directed through the heels during a full range of exercise motion.

\* \* \* \* \*